(12) United States Patent
Suzuki et al.

(10) Patent No.: US 6,789,865 B2
(45) Date of Patent: Sep. 14, 2004

(54) PRINTING APPARATUS AND PRINTING SYSTEM

(75) Inventors: Noriyuki Suzuki, Tokyo (JP); Sohei Tanaka, Kanagawa (JP); Masafumi Wataya, Kanagawa (JP); Yasutomo Watanabe, Kanagawa (JP); Akira Kuronuma, Tokyo (JP); Toru Nakayama, Kanagawa (JP); Shinichiro Takahama, Chiba (JP); Takuji Katsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/080,675

(22) Filed: Feb. 25, 2002

(65) Prior Publication Data

US 2002/0118238 A1 Aug. 29, 2002

(30) Foreign Application Priority Data

Feb. 28, 2001  (JP) ........................ 2001-055463

(51) Int. Cl.$^7$ ............................. B41J 29/38
(52) U.S. Cl. ................. 347/9; 347/5; 347/14; 347/19
(58) Field of Search ............ 347/9, 5, 14, 19; 395/112; 400/61; 358/1.2, 1.16

(56) References Cited

U.S. PATENT DOCUMENTS

| | | | |
|---|---|---|---|
| 4,313,124 A | 1/1982 | Hara | 346/140 |
| 4,345,262 A | 8/1982 | Shirato et al. | 346/140 |
| 4,459,600 A | 7/1984 | Sato et al. | 346/140 |
| 4,463,359 A | 7/1984 | Ayata et al. | 346/1.1 |
| 4,558,333 A | 12/1985 | Sugitani et al. | 346/140 |
| 4,723,129 A | 2/1988 | Endo et al. | 346/1.1 |
| 4,740,796 A | 4/1988 | Endo et al. | 346/1.1 |
| 5,049,898 A | 9/1991 | Arthur et al. | 347/19 |
| 5,293,319 A * | 3/1994 | DeSha et al. | 364/464 |
| 5,539,434 A | 7/1996 | Fuse | 347/19 |
| 5,634,730 A * | 6/1997 | Bobry | 400/88 |
| 5,923,820 A * | 7/1999 | Cunnagin et al. | 395/108 |
| 5,949,447 A | 9/1999 | Arai et al. | 347/23 |
| 6,007,261 A | 12/1999 | Fujita et al. | 400/61 |
| 6,038,375 A | 3/2000 | Makino | 395/112 |
| 6,038,668 A | 3/2000 | Chipman et al. | 713/201 |
| 6,447,085 B1 * | 9/2002 | Yagi et al. | 347/9 |

FOREIGN PATENT DOCUMENTS

| | | |
|---|---|---|
| EP | 0 775 587 | 5/1997 |
| EP | 0 917 096 | 5/1999 |
| EP | 0 957 447 | 11/1999 |
| JP | 59-123670 | 7/1984 |
| JP | 59-138461 | 8/1984 |
| JP | 5-309839 | 11/1993 |
| JP | 8-224890 | 9/1996 |
| JP | 10-278360 | 10/1998 |
| JP | 2000-35922 | 2/2000 |

* cited by examiner

Primary Examiner—Hai Pham
Assistant Examiner—Lam Nguyen
(74) Attorney, Agent, or Firm—Fitzpatrick, Cella, Harper & Scinto (57) ABSTRACT

This invention provides a low-cost, economical printing apparatus and printing system. For example, characteristic information of a printhead which is described, printed, adhered, or formed on a printhead or its accessory (e.g., a packaging paper box) in a format identifiable to human or an electronic device is man-machine-interactively inputted to a host or electronically inputted to the host by a barcode reader or the like. The printing apparatus discriminates whether or not a command sent from the host via an interface is a command that includes characteristic information of the printhead, and control is made to write the characteristic information of the print head into a non-volatile memory (EEPROM) in accordance with the discriminating result. The printhead is controlled in accordance with the characteristic information written into the non-volatile memory to execute a print process.

21 Claims, 9 Drawing Sheets

PRINTED CHARACTERISTIC
INFORMATION

PRINTING APPARATUS AND PRINTING SYSTEM

FIELD OF THE INVENTION

This invention relates to a printing apparatus and printing system and, more particularly, to a printing apparatus which comprises an inkjet printhead, and a printing system using that printing apparatus.

BACKGROUND OF THE INVENTION

Conventionally, a printer apparatus which comprises a non-volatile memory such as an EEPROM, flash memory, or the like, that stores individual information such as the operation state, operation history, production number, device ID, and the like of a printhead used in that printer apparatus, and control information such as print position correction information of a head carriage upon reciprocal printing and the like, is known.

For example, Japanese Patent Publication Laid-Open No. 5-309839 discloses a printer apparatus which stores information used to correct a mount error of a printhead, Japanese Patent Publication Laid-Open No. 8-224890 discloses a printer apparatus which stores time information elapsed after the previous recovery operation of a printhead, and Japanese Patent Publication Laid-Open No. 2000-35922 discloses a printer apparatus which stores control information of an ink residual amount, head cleaning time, the position of a printhead, a roll paper residual amount, and the like.

Also, Japanese Patent Publication Laid-Open No. 10-278360 discloses a printer apparatus in which a printhead unit comprises an EEPROM, and stores information such as the operation characteristics and the like of that printhead.

In case of a printer apparatus in which a printhead is not detachable from a printer apparatus main body and the printhead need not or cannot be exchanged, all of control information, characteristic information of the printhead, and the like can be stored in a single non-volatile memory together as in the above prior art. In this case, the physical mount position of the non-volatile memory can be either on the printer main body side or printhead side, as long as they can exchange information.

However, in a case where a printhead is detachable from a printer apparatus or various types of printheads can be exchangeably and selectively attached to satisfy various user's purposes, characteristic information unique to a given printhead cannot be pre-stored in a non-volatile memory of the printer apparatus side, and control information or the like of the printer apparatus side cannot be stored in all non-volatile memories of individual printheads.

In such case, both the printer apparatus and printhead comprise non-volatile memories such as EEPROMs or the like to respectively hold necessary information.

However, such memories increase the cost of the overall printer apparatus accordingly. In the case of a disposable type of printhead, a non-volatile memory is also disposed every time the printhead is exchanged. This is not economical. Furthermore, even in the case of a printhead which is not of the disposable type but can be repetitively used by exchanging or refilling only ink (or an ink tank), since the lifetime of the printhead is normally much shorter than that of the printer apparatus main body, the printhead must be exchanged several times during the lifetime of the printer main body. This is also not economical as with the case of using the disposable type of printhead.

SUMMARY OF THE INVENTION

Accordingly, it is an object of the present invention to provide a low-cost, economical printing apparatus and printing system, in which only a printing apparatus main body comprises a non-volatile memory, which has been conventionally provided to both the printing apparatus main body and printhead, so as to unifiedly manage control information, characteristic information of a printhead, and the like.

According to one aspect of the present invention, the foregoing object is attained by providing a printing apparatus for printing on a printing medium using a printhead, comprising: an interface which is connected to a host and receives information from the host; a non-volatile memory for storing characteristic information of the printhead; discriminating means for discriminating whether or not a command sent from the host is a command including the characteristic information of the printhead; write control means for controlling to write the characteristic information of the printhead into the non-volatile memory in accordance with a discrimination result of the discriminating means; and printing control means for controlling the printhead to print in accordance with the characteristic information written into the non-volatile memory.

Note that the characteristic information preferably includes type information of the printhead, and the write control means controls to write the characteristic information of the printhead for each type of printhead.

The printhead is detachable from a printing apparatus main body, and a user can selectively attach a desired one of a plurality of types of printheads to the printing apparatus.

The discriminating means preferably includes means for receiving a command outputted from the host to which the characteristic information of the printhead indicated on the printhead or an accessory of the printhead in a format identifiable to human or an electronic device is inputted by man-machine interactive operation or the electronic device.

The printhead is an inkjet printhead for printing by discharging ink, and the inkjet printhead preferably comprises an electrothermal transducer for generating heat energy to be given to ink so as to discharge ink by utilizing the heat energy.

Furthermore, the non-volatile memory includes an EEPROM.

According to another aspect of the present invention, the foregoing object is attained by providing a printing system including the above-described printing apparatus, and a host connecting to the printing apparatus and capable of communicating with a second system via a network, the host comprising: input means for inputting individual information of a printhead indicated on the printhead or an accessory of the printhead in a format identifiable to human or an electronic device via man-machine interactive operation or the electronic device; retrieve means for accessing the second system via the network on the basis of the individual information of the printhead inputted by the input means, and retrieving characteristic information of the printhead corresponding to the individual information of the printhead; and transfer means for transferring the characteristic information of the printhead retrieved by the retrieve means to the printing apparatus.

Note that the network includes a LAN or Internet, and the individual information of the printhead can be a production number of the printhead.

The second system has a database in which information is retrievable via the network, and the database holds characteristic information of the printhead corresponding to the individual information of the printhead.

Note that the format identifiable to human is at least one of a digit and a character string, and the format identifiable to the electronic device is a barcode.

In a case where the characteristic information of the printhead is input by the man-machine interactive operation, at least one of a digit and a character string is preferably input to the host. In a case where the characteristic information is input from the electronic device, a barcode is preferably read by a barcode reader.

In accordance with the present invention as described above, the characteristic information of a printhead indicated on the printhead or its accessory in a format identifiable to human or an electronic device is input to a host by man-machine interactive operation or electronically by the electronic device. The printing apparatus discriminates whether or not a command sent from the host via an interface contains the characteristic information of the printhead, controls to write the characteristic information of the printhead in a non-volatile memory in accordance with the discriminating result, and controls the printhead to print.

The invention is particularly advantageous since a non-volatile memory for storing characteristic information is no longer required for a printhead unlike in the conventional apparatus.

In this way, a low-cost, economical printhead and printing apparatus can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

<Brief Description of Apparatus Main Unit>

Figure 1:
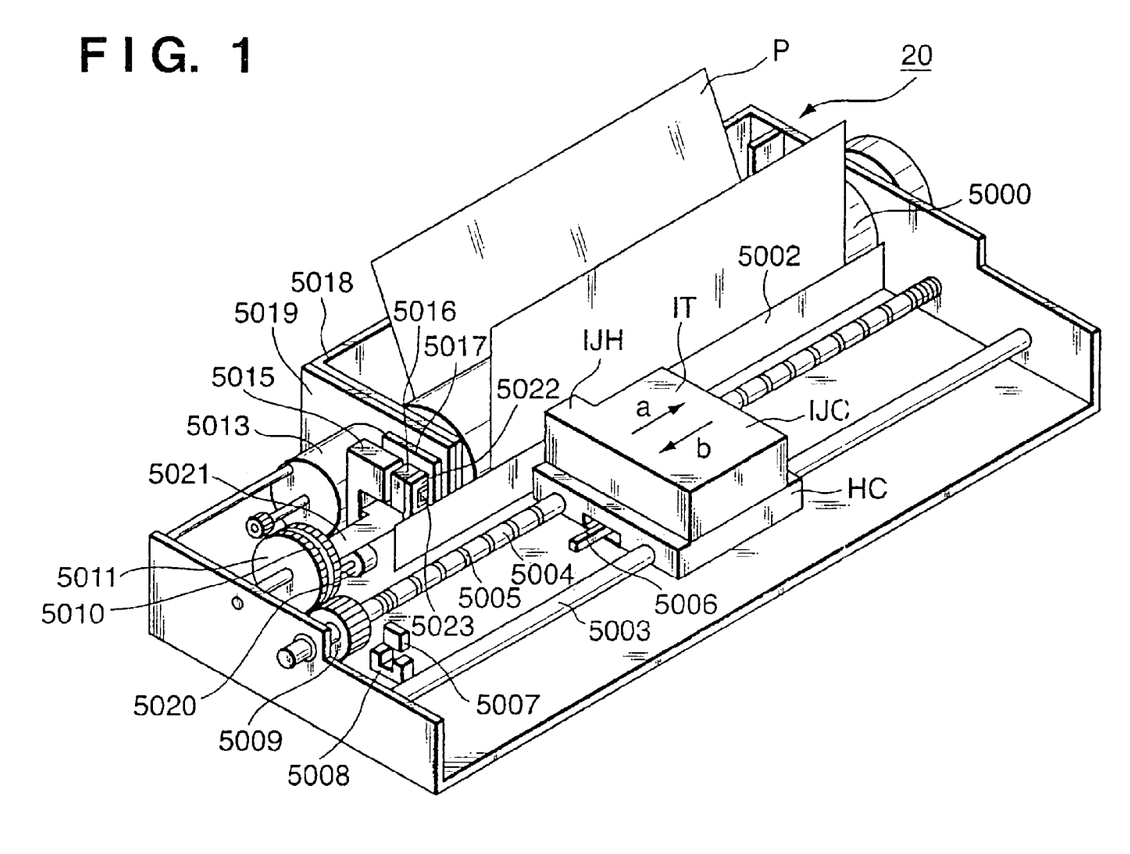
FIG. 1 is a perspective view showing the outer appearance of an inkjet printer IJRA as a representative embodiment of the present invention.

FIG. 1 is a perspective view showing the outer appearance of an ink-jet printer 20 (hereinafter referred to as a printer) as a typical embodiment of the present invention. Referring to FIG. 1, a carriage HC engages with a spiral groove 5005 of a lead screw 5004, which rotates via driving force transmission gears 5009 to 5011 upon forward/reverse rotation of a driving motor 5013. The carriage HG has a pin (not shown), and is reciprocally scanned in the directions of arrows a and b in FIG. 1. An integrated ink-jet cartridge IJC which incorporates a printhead IJH and an ink tank IT is mounted on the carriage HC. Reference numeral 5002 denotes a sheet pressing plate, which presses a paper sheet against a platen 5000, ranging from one end to the other end of the scanning path of the carriage. Reference numerals 5007 and 5008 denote photocouplers which serve as a home position detector for recognizing the presence of a lever 5006 of the carriage in a corresponding region, and used for switching, e.g., the rotating direction of the motor 5013. Reference numeral 5016 denotes a member for supporting a cap member 5022, which caps the front surface of the printing head IJH; and 5015, a suction device for suctioning ink residue through the interior of the cap member. The suction device 5015 performs suction recovery of the printing head via an opening 5023 of the cap member 5015. Reference numeral 5017 denotes a cleaning blade; and 5019, a member which allows the blade to be movable in the back-and-forth direction of the blade. These members are supported on a main unit support plate 5018. The shape of the blade is not limited to this, but a known cleaning blade can be used in this embodiment. Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5004 when the carriage reaches the home-position side region. However, the present invention is not limited to this arrangement as long as desired operations are performed at known timings.

<Description of Control Construction>

Next, a control construction for performing a printing control in the above apparatus will be described.

Figure 2:
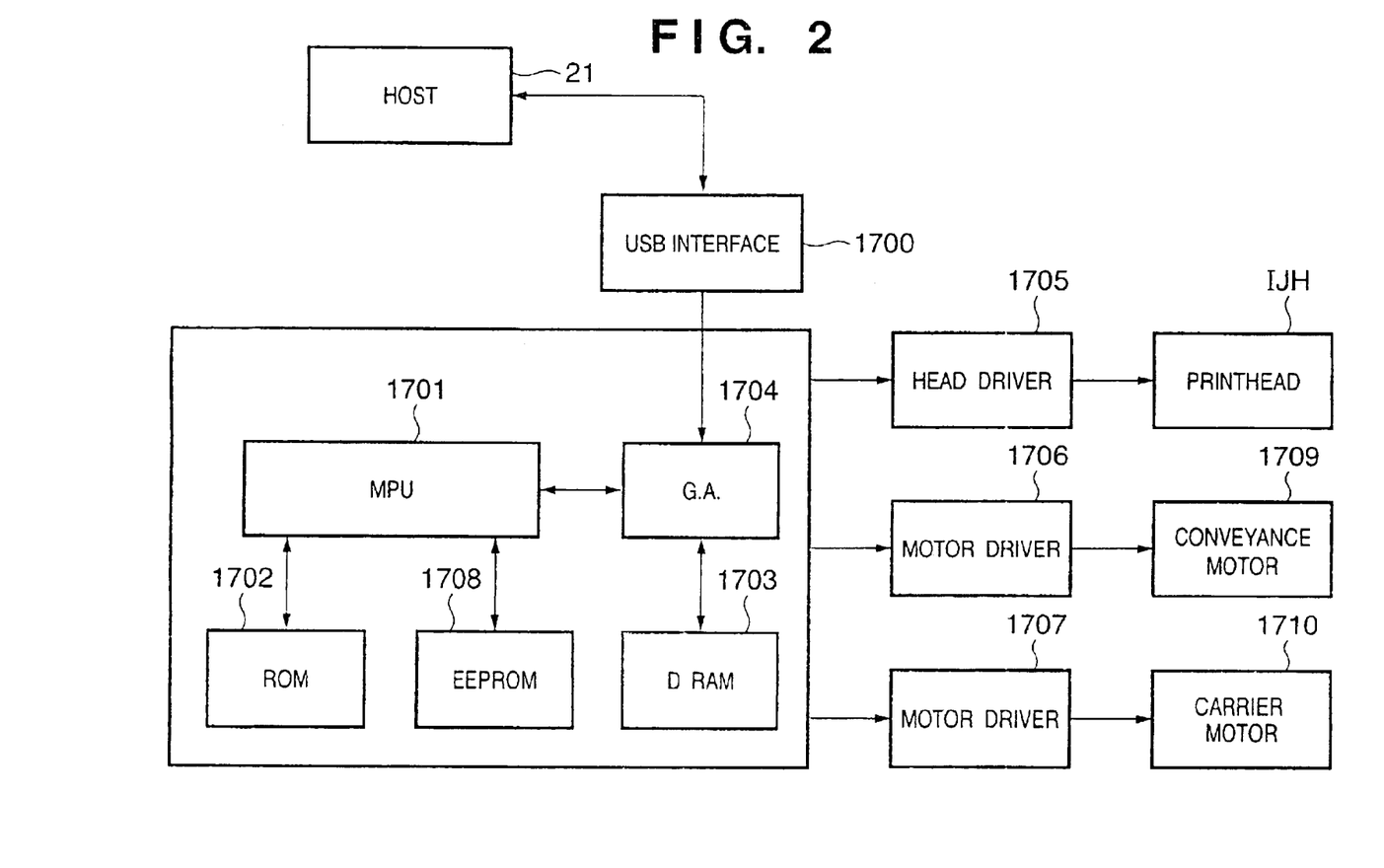
FIG. 2 is a block diagram showing the arrangement of a control circuit of the inkjet printer.

FIG. 2 is a block diagram showing the arrangement of a control circuit of the printer 20. Referring to FIG. 2 showing the control circuit, reference numeral 1700 denotes a USB interface for inputting a printing signal from a personal computer 21 (hereinafter referred to as a host); 1701, an MPU; 1702, a programmable ROM for storing a control program executed by the MPU 1701 and necessary control data; and 1703, a DRAM for storing various data (the printing signal, printing data supplied to the printhead IJH, and the like). Reference numeral 1704 denotes a gate array (G.A.) for performing supply control of printing data to the printhead IJH. The gate array 1704 also performs data transfer control among the interface 1700, the MPU 1701, and the RAM 1703. Reference numeral 1710 denotes a carrier motor for carrying the printhead IJH; and 1709, a conveyance motor for conveying a printing medium (e.g., a printing sheet). Reference numeral 1705 denotes a head driver for driving the printhead IJH; and 1706 and 1707, motor drivers for driving the conveyance motor 1709 and the carrier motor 1710.

Reference numeral 1708 denotes an EEPROM used to store the characteristic information of a printhead in addition to the production number, operation state, various kinds of correction information, and the like of the printer.

The operation of the above control arrangement will be explained next. When print data is input to the interface 1700, it is converted into a print signal between the gate array 1704 and MPU 1701. The motor drivers 1706 and 1707 are driven, and the printhead IJH is driven in accordance with print data sent to the head driver 1705, thus printing.

Note that an ink tank IT and the printhead IJH may be integrally formed to constitute an exchangeable ink cartridge IJC, as described above. Also, the ink tank IT and the printhead IJH may be separably arranged, and the ink tank IT alone may be exchanged when ink is exhausted.

In place of the USB interface 1700, interfaces of other standards, e.g., a Centronics or IEEE1284 interface may be used.

Figure 3:
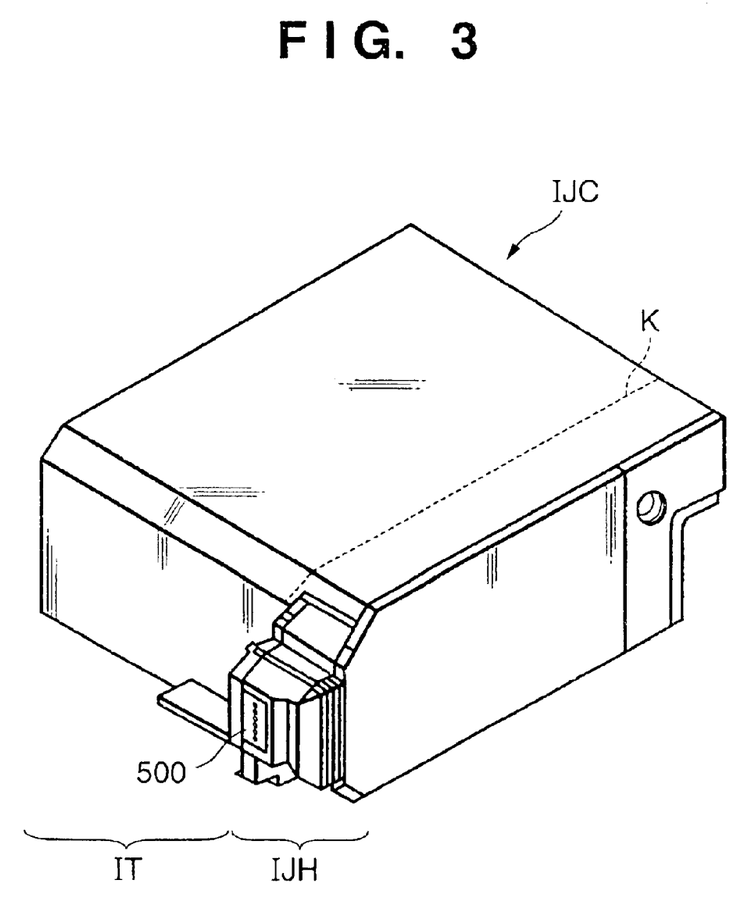
FIG. 3 is a perspective view showing the outer appearance of the structure of an inkjet cartridge IJC in which an ink tank and printhead are separable.

FIG. 3 is a perspective view showing the structure of an ink cartridge IJC in which an ink tank and printhead are separable. As shown in FIG. 3, in the ink cartridge IJC, an ink tank IT and printhead IJH are separable at the position of a boundary line K. The ink cartridge IJC has electrodes (not shown) for receiving an electrical signal supplied from the carriage HC when it is mounted on a carriage HC. This electrical signal drives printing elements of the printhead IJH to discharge ink, as described above.

Note that reference numeral 500 in FIG. 3 denotes an ink discharge port array. The ink tank IT has a fibrous or porous ink absorber for holding ink, and the ink absorber holds ink.

As the printhead IJH detachable from the printer apparatus used in this embodiment, a plurality of types of printheads are available: for example, a monochrome printhead, color printhead, photo-quality printhead, and the like. A user can selectively attach an optimal one of these printheads according to the user's need. Each of these printheads has a signal terminal which can output a 2-bit signal regardless of its type. When a printhead is mounted on the printer 20, it outputs a 2-bit ON/OFF signal, so that the printer 20 can identify the type of currently mounted printhead. In this arrangement, up to four different printhead types can be identified.

Note that the signal terminal for outputting a 2-bit signal used to identify the printhead type may be a dedicated terminal, but it may be commonly used as another signal terminal since that identification process is not always executed during the print process.

With this arrangement, the printer 20 of this embodiment receives print data from the host 21 via the USB interface 1700, generates a signal to be transferred to the printhead IJH based on the received information, and transfers the generated signal to the printhead IJH to control it to discharge ink onto a printing medium (e.g., a printing sheet), thus attaining a desired print process.

The host 21 and printer 20 exchange various commands and corresponding status values via the USB interface 1700, in addition to print data. These command status values include a write instruction of the characteristic information of the printhead IJH into the EEPROM 1708, in addition to confirmation of the operation state, confirmation of the presence/absence of errors, a head cleaning instruction, an ON/OFF instruction of the power supply of the printer 20, and the like. Whether data sent from the host 21 is print data or a command, and the type of command if the data is a command can be identified based on a header appended to the header of that transferred data.

Figure 4:
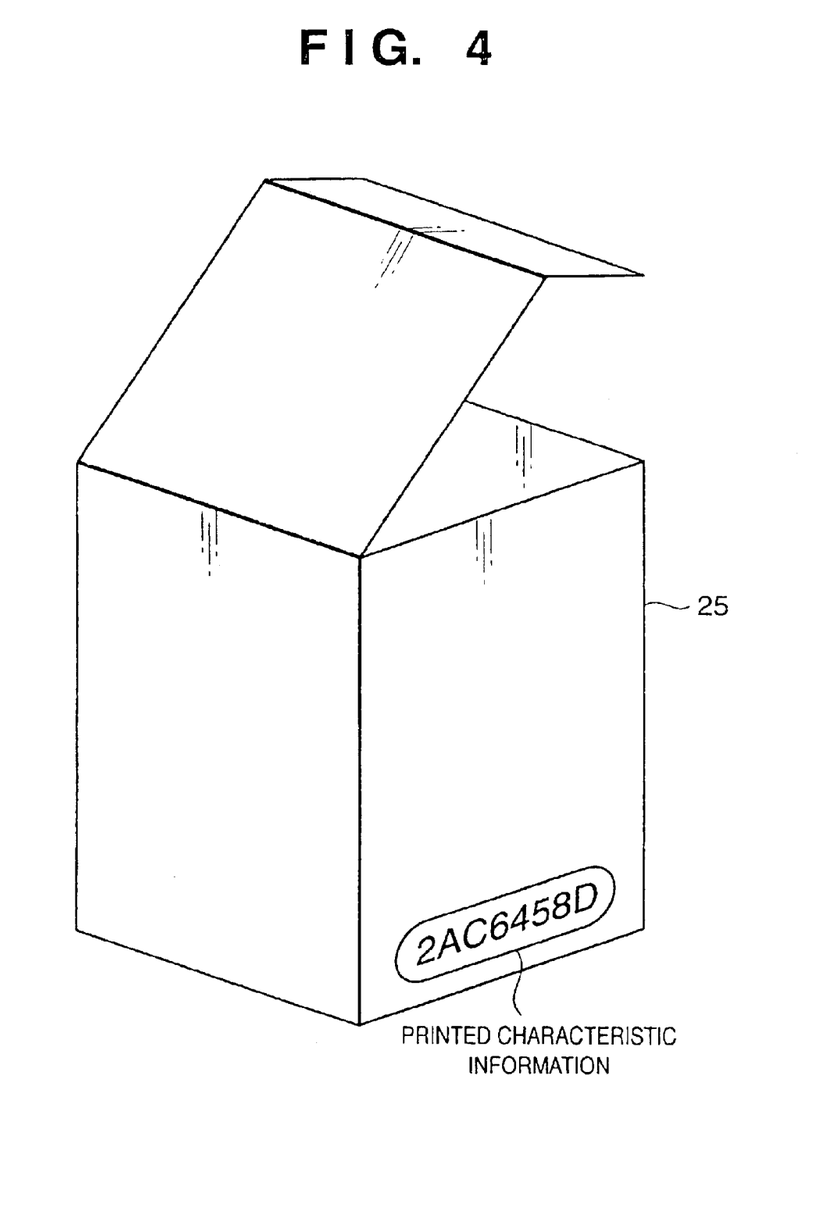
FIG. 4 is a perspective view showing the outer appearance of a packaging paper box on which the characteristic information of a printhead is printed.

FIG. 4 is a perspective view showing the outer appearance of a packaging paper box, which is an accompanying material with the printhead, for packing the printhead IJH.

As shown in FIG. 4, the characteristic information of the printhead or information related to the characteristic information which is converted into a hexadecimal character string code is indicated (printed) on the side surface of a packaging paper box 25 upon shipping. The information is appended with type information of a printhead and check sum information for error detection, and information of a total of 64 bits, which include: 52 bits for exact characteristic information such as the correction value of an ink discharge amount, the resistance of a heater for ink discharge, fluctuation correction value for each nozzle, and the like, or information related to the exact characteristic information; 4 bits for type information; and 8 bits for a check sum, is converted into an 8-digit, hexadecimal code.

Figure 5:
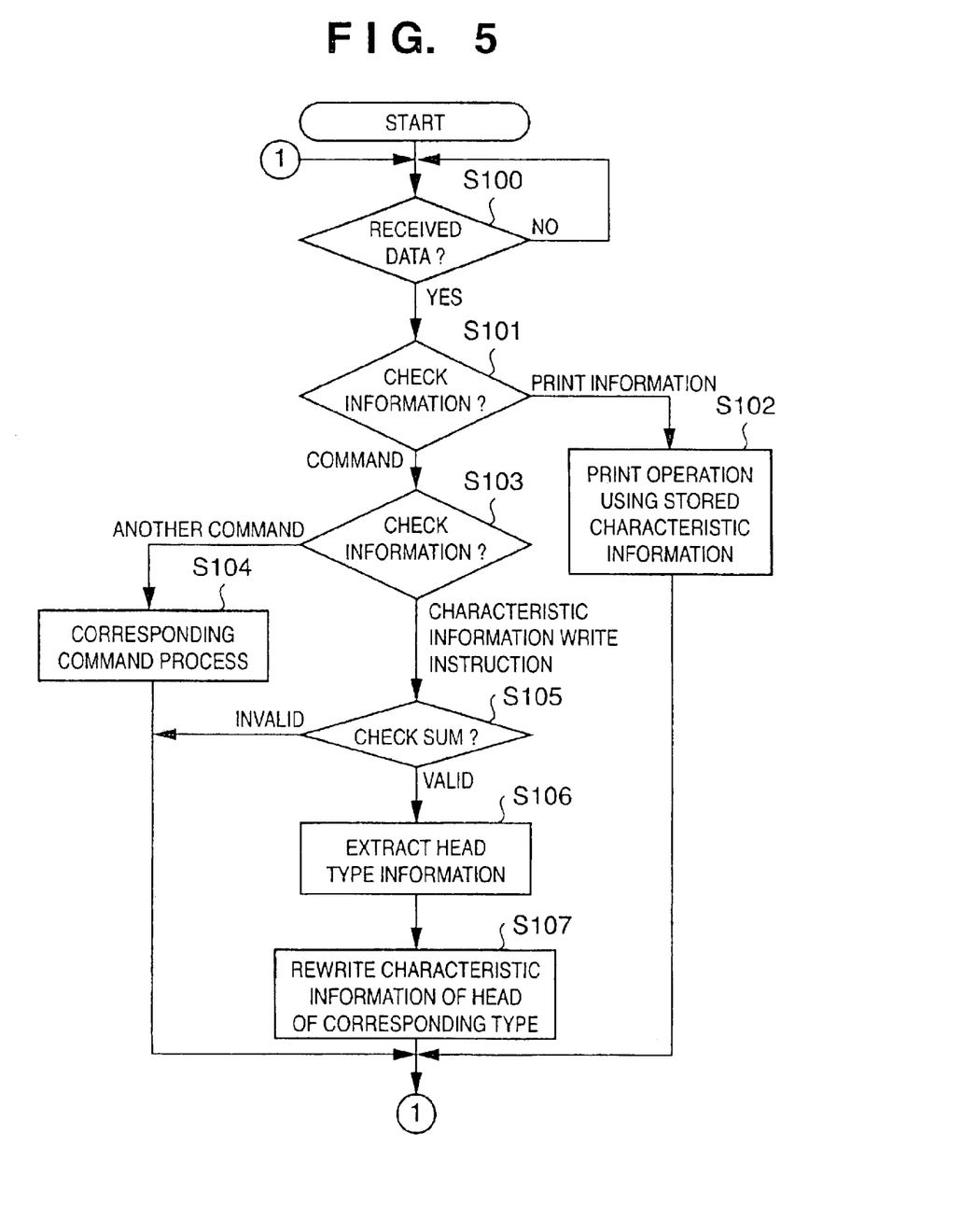
FIG. 5 is a flow chart showing the process for identifying the type of printhead and inputting the characteristic information of the printhead.

The process for identifying the type of printhead and inputting the characteristic information of the printhead of this embodiment will be described in detail below with reference to the flow chart shown in FIG. 5.

In step S100, the control waits for data received from the host 21. Upon detecting data reception, the flow advances to step S101 to check if the received data is print information or a command.

If it is determined that the received data is print information, the flow advances to step S102, and the printhead is driven using the characteristic information corresponding to the type of currently mounted printhead on the basis of the characteristic information currently stored in the EEPROM 1708, thus making a print process. After that, the flow returns to step S100. On the other hand, if it is determined that the received data is a command, the flow advances to step S103.

It is discriminated in step S103 if the command is a write instruction command of the characteristic information of a printhead into the EEPROM 1708 or another command. If it is discriminated that the received command is a command other than the write instruction of the characteristic information of a printhead, the flow advances to step S104 to execute a process corresponding to that received command. After that, the flow returns to step S100.

If the received command is the write instruction of the characteristic information of a printhead into the EEPROM 1708, the flow advances to step S105 to confirm a check sum. If it is confirmed that the instruction is effective, the flow advances to step S106 to extract the type information of the printhead. Furthermore, the characteristic information of the printhead of that type, which is stored in the EEPROM 1708 is rewritten by the characteristic information received from the host 21 in step S107.

The flow then returns to step S100 to wait for the next data.

The way of how the characteristic information and the type of printhead are transferred to the printer 20 upon receiving from the host 21 the write instruction command of the characteristic information of the printhead into the EEPROM 1708 will be explained below.

When a user who has purchased the printer apparatus attaches a printhead for the first time, when a user who has purchased a commercially available optional printhead attaches that printhead for the first time, or when the lifetime of a printhead has expired and a user exchanges that printhead with a separately purchased one, he or she activates utility software (which is attached to the printer apparatus in the form of a CD-ROM or the like together with driver software and the like upon shipping from a factory) on the host 21, and inputs the characteristic information of the printhead printed on the packaging paper box 25 at a keyboard or the like of the host 21 in accordance with an instruction on the window displayed on a display (LCD, CRT, PDP, or the like) of the host 21 upon executing that software.

Note that this software need not be a standalone program, but may be activated as one of setup menus upon executing driver software.

The characteristic information which is input in accordance with the instruction from the utility software which runs on the host 21 is set as an operand of a command that indicates a write instruction of the characteristic information of the printhead in the EEPROM 1708, and is sent to the printer 20 together with that command. In this way, the information is finally written into the EEPROM 1708.

Once the characteristic information is written into the EEPROM 1708, a print process is performed using that characteristic information. Since the characteristic information of the printhead is written for each type of printhead, it need only be written once when the printhead is attached to the printer for the first time. Hence, the user need not write the characteristic information every time he or she exchanges the printhead with another type of printhead according to his or her purpose (e.g., the user exchanges a monochrome printhead with a color printhead).

Therefore, according to the aforementioned embodiment, the characteristic information of a printhead is printed as a character code on the packaging paper box of that printhead, and the user reads and inputs that code via the keyboard. The host to which the printer is connected sends that code via the printer interface to write it into the EEPROM of the printer. In this manner, an EEPROM conventionally required in the printhead is no longer necessary.

In the above embodiment, the EEPROM is used as a non-volatile memory. However, the present invention is not limited to such a specific memory. For example, other non-volatile memories such as a flash memory and the like may be used.

The characteristic information of the printhead is not only printed as a character code on the packaging paper box which is an accompanying material, but also directly printed, impressed or engraved on the side surface or the like of the printhead. Alternatively, the characteristic information may be printed or stamped on an accompanying material including a paper sheet such as a manual, warranty, or the like included in a package, or may be printed, impressed, or engraved on another accompanying material including an anti-dry packaging or wrapping material that wraps the printhead upon shipping.

[Another Embodiment]

In the above embodiment, the present invention is applied to a case wherein a user writes the characteristic information of the printhead into the EEPROM of the printer. Also, the present invention can be applied to the production line of a factory.

Figure 6:
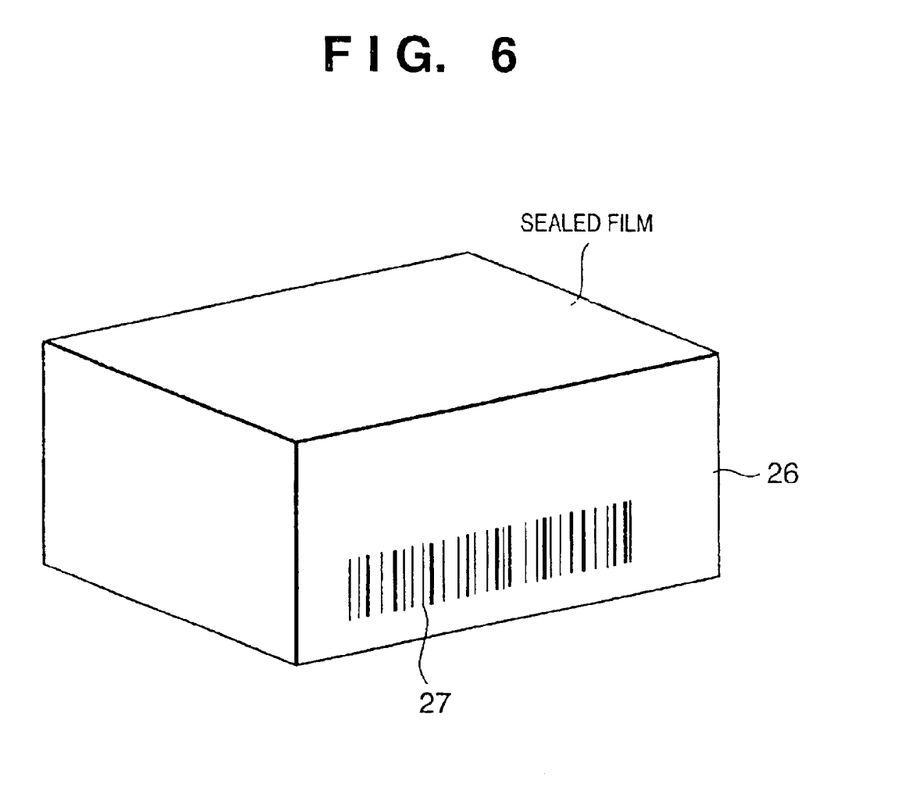
FIG. 6 is a perspective view showing a packaging plastic box to which a seal on which a barcode obtained by converting the characteristic information of the printhead is printed is adhered.

FIG. 6 shows a packaging plastic box 26, which wraps a printhead, the top portion of which is covered by an openable film sealed by, e.g., heat welding or the like. A barcode seal 27 printed with a barcode, which is obtained by converting the characteristic information of a printhead, is adhered in advance to the side surface of the packaging plastic box 26 during production process of the printhead.

Figure 7:
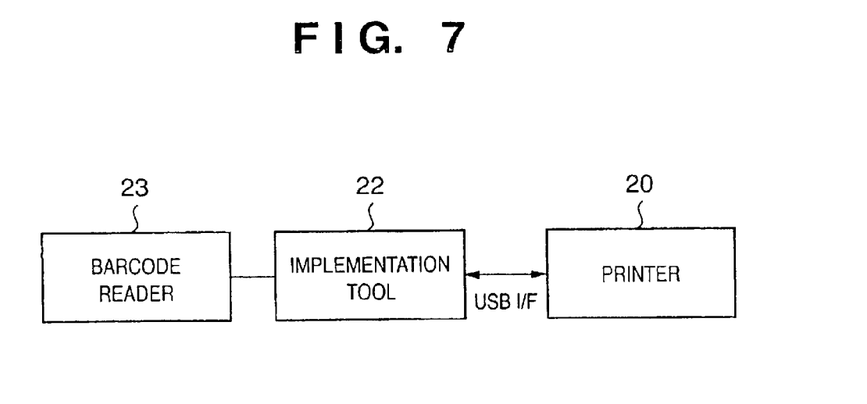
FIG. 7 is a schematic block diagram showing an overview of a production line system in a factory for inputting the characteristic information of a printhead to a printer.

On the other hand, FIG. 7 is a schematic block diagram showing an overview of a production line system of a factory that implements this embodiment.

Referring to FIG. 7, reference numeral 20 denotes a printer described in the above embodiment (no printhead is mounted since it is still on the production line in the factory); and 22, an implementation tool having the same USB interface as the USB interface 1700 of the printer 20. The implementation tool 22 is used to send the characteristic information of the printhead to the printer 20 as a command. As can be seen from FIG. 7, a barcode reader 23 is connected to the implementation tool 22.

In the production line system with the above arrangement, the barcode seal 27 adhered on the side surface of the packaging plastic box 26 that stores a printhead is read using the barcode reader 23, and the read characteristic information is sent to the printer 20 using the implementation tool 22 and is written into the EEPROM 1708. After that, the printer 20 and packaging plastic box 26 can be shipped together in a single package.

In the above description, the characteristic information of the printhead is converted into a barcode to be indicated. However, the present invention is not limited to this. For example, the characteristic information of the printhead may be printed in an electrically, magnetically or optically readable format such as magnetic recording, OCR, or the like other than the barcode. In such case, an implementation tool that comprises a corresponding reader is used.

Therefore, according to the aforementioned embodiment, in the production line of a factory in which packaging plastic boxes that store printheads and printers are packed and shipped in a large quantity in a short period of time, the characteristic information of a printhead to be packed can be efficiently read and written into the EEPROM of the corresponding printer.

In this way, since the characteristic information of the printhead has already been written in the EEPROM of the printer packed together with that printhead upon shipping from the factory, the need for writing characteristic information of the printhead can be obviated when a user who has purchased the printer attaches the printhead for the first time unlike in the above embodiment.

In the aforementioned embodiments, the characteristic information itself of the printhead is printed on the packaging paper box or packaging plastic box.

Figure 8:
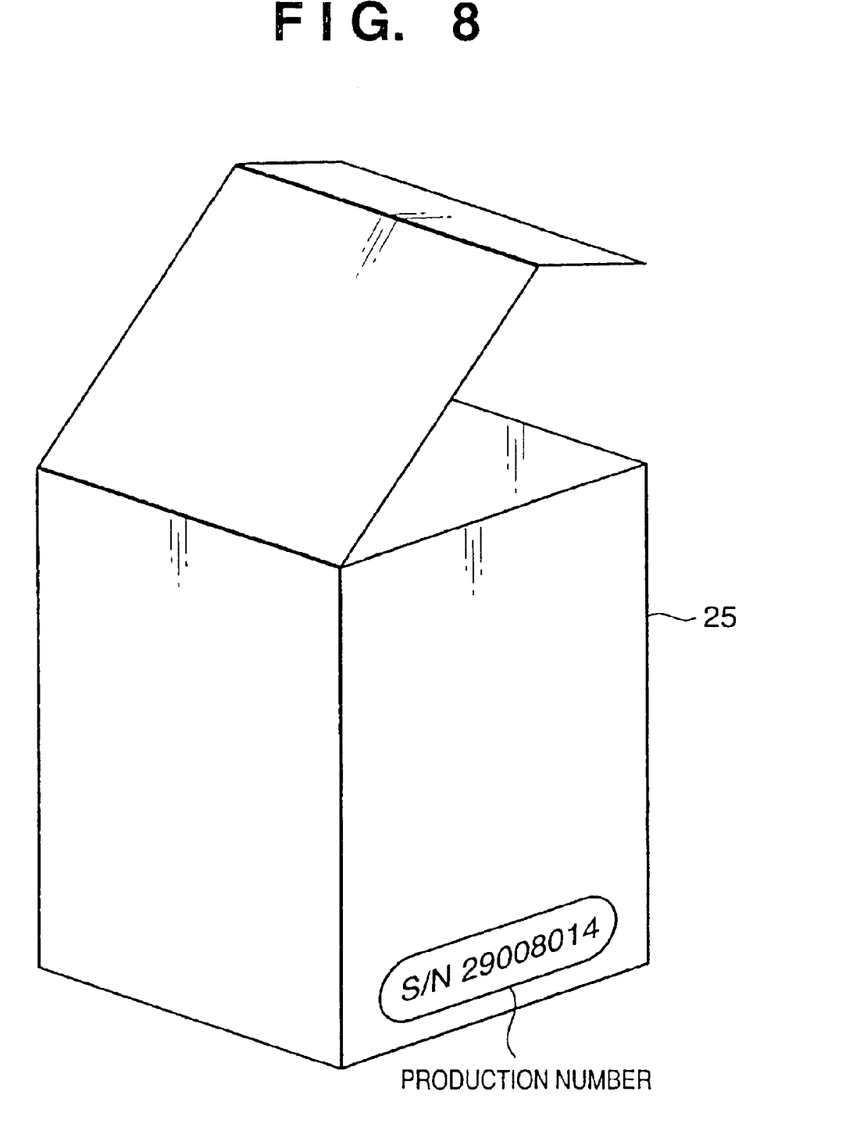
FIG. 8 is a perspective view showing the outer appearance of a packaging paper box on which the characteristic information of a printhead is printed.

However, the characteristic information itself need not always be printed. For example, as shown in FIG. 8, a unique number (individual number) such as the production number or the like of a printhead may be printed on the packaging paper box 25 of the printhead, and the characteristic information of the printhead may be retrieved from a database via a network on the basis of the unique number.

Figure 9:
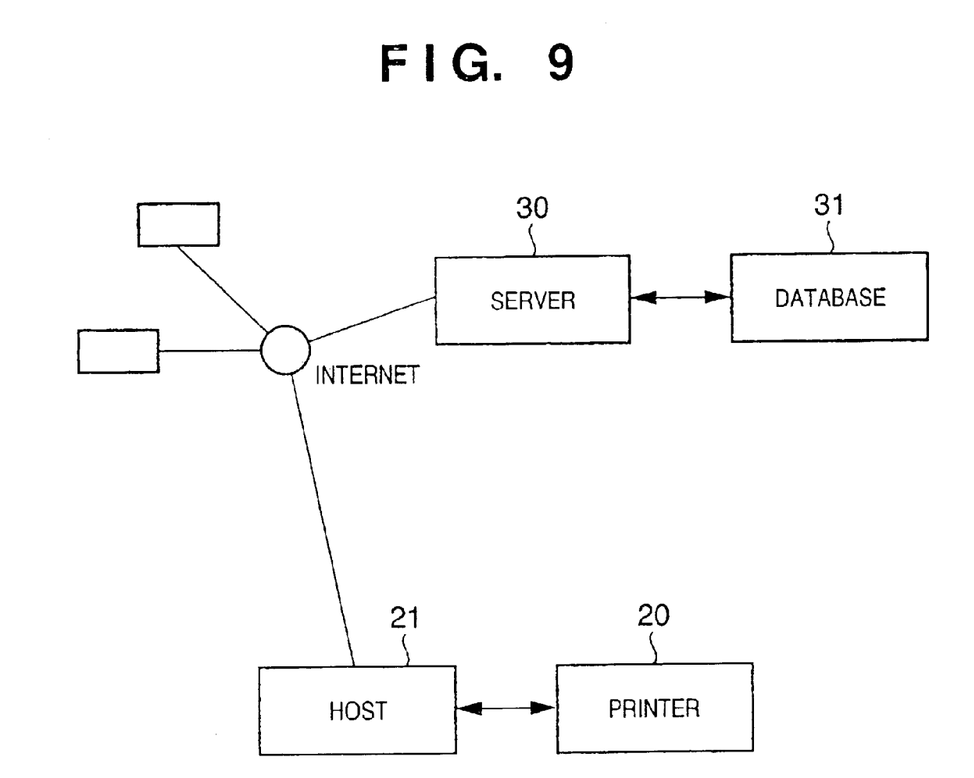
FIG. 9 is a schematic block diagram showing a system that downloads the characteristic information of a printhead via the Internet.

For example, when the host 21 to which the printer 20 is connected is connected to the Internet, as shown in FIG. 9, the host 21 is set to be capable of accessing, via the Internet, a database 31 built in a server 30 provided by the manufacturer of the printer and printhead, and the database 31 accumulates characteristic information of all shipped printheads, so that characteristic information of a printhead can be retrieved based on the production number of the printhead. Then, the user can obtain the characteristic information corresponding to the production number of his or her printhead. In this way, the retrieved characteristic information of the printhead is sent from the host 21 to the printer 20, and is finally written into the EEPROM 1708.

In this case, it goes without saying that an Internet communication program used to access the database 31 and an access program to the database 31 have been already installed in the host 21, and these programs are ready to run.

In the example shown in FIG. 9, the characteristic information of the printhead is remotely acquired via the Internet.

If the Internet is replaced by a LAN, and the host 21 is replaced by the implementation tool 22, this method can be used in the production line of the factory.

Note that in the above embodiments, the liquid discharged from the printhead has been described as ink, and the liquid contained in the ink tank has been described as ink. However, the liquid is not limited to ink. For example, the ink tank may contain processing liquid or the like discharged to a print medium to improve fixability or water repellency of a printed image or to increase the image quality.

The embodiments described above have exemplified a printer, which comprises means (e.g., an electrothermal transducer, laser beam generator, and the like) for generating heat energy as energy utilized for execution of ink discharge, and causes a change in state of the ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open Publication No. 59-123670 which discloses the arrangement using a slot common to a plurality of electrothermal transducers as a discharge portion of the electrothermal transducers, or Japanese Patent Laid-Open No. 59-138461 Publication which discloses the arrangement having an opening for absorbing a pressure wave of heat energy in correspondence with a discharge portion.

In addition, an exchangeable chip type printhead which can be electrically connected to the apparatus main body and can receive ink from the apparatus main body upon being mounted on the apparatus main body can be employed as well as a cartridge type printhead in which an ink tank is integrally arranged on the printhead itself as described in the above embodiments.

It is preferable to add recovery means for the printhead, preliminary auxiliary means and the like to the above-described construction of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a nonuse state and liquefies upon heating may be used. In any case, an ink which liquefies upon application of heat energy according to a printing signal and is discharged in a liquid state, an ink which begins to solidify when it reaches a printing medium, or the like, is applicable to the present invention. In the present invention, the above-mentioned film boiling method is most effective for the above-mentioned inks.

In addition, the ink-jet printer of the present invention may be used in the form of a copying machine combined with a reader and the like, or a facsimile apparatus having a transmission/reception function in addition to an image output terminal of an information processing apparatus such as a computer.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) storing software program code for performing the aforesaid processes in a system or an apparatus, reading the program code with a computer (e.g., CPU, MPU) of the system or apparatus from the storage medium, then executing the program. In this case, the program code read from the storage medium realizes the functions according to the embodiments, and the storage medium storing the program code constitutes the invention. Furthermore, besides the aforesaid functions according to the above embodiments being realized by executing the program code which is read by a computer, the present invention includes a case where an OS (operating system) or the like working in the computer performs a part of or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, a CPU or the like contained in the function expansion card or unit performs a part of or entire processes in accordance with designations of the program code and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus for printing on a printing medium using a printhead, comprising:

an interface for connecting to a host and receiving information from the host;

a memory for storing characteristic information of the printhead;

discriminating means for discriminating whether or not a command sent from the host based on information inputted to the host is a command including the characteristic information of the printhead;

confirmation means for confirming whether or not the command including the characteristic information of the printhead discriminated by said discriminating means is valid;

write control means for controlling to write the characteristic information of the printhead into said memory in a case that said confirmation means confirms that the command is valid; and printing control means for controlling the printhead to print in accordance with the characteristic information written into said memory.

2. The apparatus according to claim 1, wherein the characteristic information includes type information of the printhead, and said write control means controls to write the characteristic information of the printhead for each type of printhead.

3. The apparatus according to claim 1, wherein the printhead is detachable from a printing apparatus main body, and is attached to said printing apparatus after being selected from among plural types of printheads by a user.

4. The apparatus according to claim 1, wherein said discriminating means includes means for receiving a command outputted from the host to which the characteristic information of the printhead indicated on the printhead or an accessory of the printhead in a format identifiable by a human or an electronic device is inputted by a man-machine interactive operation or the electronic device.

5. The apparatus according to claim 4, wherein the format identifiable by a human is at least one of a digit and a character string.

6. The apparatus according to claim 4, wherein the format identifiable by an electronic device is a barcode.

7. The apparatus according to claim 4, wherein the indication in a format identifiable by a human or an electronic device is a described, adhered or formed indication.

8. The apparatus according to claim 1, wherein the printhead is an inkjet printhead for printing by discharging ink.

9. The apparatus according to claim 8, wherein the inkjet printhead comprises an electrothermal transducer for generating heat energy to be applied to ink so as to discharge the ink by utilizing the heat energy.

10. The apparatus according to claim 1, wherein said memory includes an EEPROM.

11. The apparatus according to claim 1, wherein the command sent from the host is a command outputted from the host which is externally instructed or receives an instruction.

12. A printing system including a printing apparatus according to claim 1, and a host connecting to the printing apparatus and capable of communicating with a second system via a network, said host comprising:

input means for inputting individual information of a printhead indicated on the printhead or an accessory of the printhead in a format identifiable by a human or an electronic device via man-machine interactive operation or the electronic device;

retrieve means for accessing the second system via the network on the basis of the individual information of the printhead inputted by said input means, and retrieving characteristic information of the printhead corresponding to the individual information of the printhead; and transfer means for transferring the characteristic information of the printhead retrieved by said retrieve means to the printing apparatus.

13. The printing system according to claim 12, wherein the network includes a LAN or Internet.

14. The printing system according to claim 12, wherein the individual information of the printhead is a production number of the printhead.

15. The printing system according to claim 12, wherein said second system has a database in which information is retrievable via the network, and the database holds characteristic information of the printhead corresponding to the individual information of the printhead.

16. The printing system according to claim 12, wherein the format identifiable by a human is at least one of a digit and a character string.

17. The printing system according to claim 16, wherein said input means inputs said at least one of the digit and character string by the man-machine interactive operation.

18. The printing system according to claim 12, wherein the format identifiable by the electronic device is a barcode.

19. The printing system according to claim 18, wherein the electronic device is a barcode reader.

20. The printing system according to claim 12, wherein the indication in a format identifiable by a human or an electronic device is a described, adhered or formed indication.

21. The apparatus according to claim 1, wherein the information inputted to the host is originally from any of a plurality of input means.

* * * * *